US012712205B2

(12) United States Patent
Xiong et al.

(10) Patent No.: US 12,712,205 B2
(45) Date of Patent: Aug. 18, 2026

(54) ELECTROLYTE, ELECTROCHEMICAL DEVICE AND ELECTRONIC DEVICE

(71) Applicant: Ningde Amperex Technology Limited, Fujian (CN)

(72) Inventors: Yali Xiong, Ningde (CN); Mingming Guan, Ningde (CN); Rong Wang, Ningde (CN); Jianming Zheng, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 624 days.

(21) Appl. No.: 18/315,595

(22) Filed: May 11, 2023

(65) Prior Publication Data

US 2023/0361349 A1 Nov. 9, 2023

Related U.S. Application Data

(63) Continuation of application No. PCT/CN2020/128359, filed on Nov. 12, 2020.

(51) Int. Cl.

| | |
|---|---|
| ***H01M 10/0567*** | (2010.01) |
| ***H01M 10/0525*** | (2010.01) |
| ***H01M 50/46*** | (2021.01) |

(52) U.S. Cl.

CPC ... *H01M 10/0567* (2013.01); *H01M 10/0525* (2013.01); *H01M 50/46* (2021.01); *H01M 2220/30* (2013.01); *H01M 2300/0051* (2013.01)

(58) Field of Classification Search

None

See application file for complete search history.

(56) References Cited

U.S. PATENT DOCUMENTS

| | | | | |
|---|---|---|---|---|
| 2001/0018151 | A1* | 8/2001 | Kim | H01M 6/168 429/231.95 |
| 2011/0076572 | A1 | 3/2011 | Amine et al. | |
| 2016/0294007 | A1* | 10/2016 | Kefei | H01M 10/4235 |
| 2020/0144672 | A1* | 5/2020 | Ji | H01M 4/625 |

FOREIGN PATENT DOCUMENTS

| | | | |
|---|---|---|---|
| CN | 100362689 | C | 1/2008 |
| CN | 103311539 | A | 9/2013 |
| CN | 103682297 | A | 3/2014 |
| CN | 104505535 | A | 4/2015 |
| CN | 105226321 | A | 1/2016 |

(Continued)

OTHER PUBLICATIONS

International Search Report, issued on Jun. 24, 2021, in corresponding International Patent Application No. PCT/CN2020/128359, 8 pages.

Office Action issued on Jun. 23, 2022, in corresponding Chinese Patent Application No. 202080012534.X, 16 pages.

Office Action issued on Jul. 16, 2024, in corresponding Japanese Application No. 2023-528338, 10 pages.

(Continued)

*Primary Examiner* — Carlos Barcena

(74) *Attorney, Agent, or Firm* — Maier & Maier, PLLC

(57) ABSTRACT

An electrolyte includes an organic solvent, a lithium salt and additives, in particular, the additives include a fluoroethylene carbonate and a P—N bond-containing compound, the P—N bond-containing compound having a structure shown in formula I; A mass percentage of the fluoroethylene carbonate in the electrolyte is a %, a mass percentage of the P—N bond-containing compound in the electrolyte is b %, and $0.1 \leq a/b \leq 200$.

13 Claims, 1 Drawing Sheet

(56) References Cited

FOREIGN PATENT DOCUMENTS

| | | | |
|---|---|---|---|
| CN | 106784997 | A | 5/2017 |
| CN | 108539137 | A | 9/2018 |
| CN | 109585924 | A | 4/2019 |
| CN | 109980225 | A | 7/2019 |
| CN | 110137463 | A | 8/2019 |
| CN | 110474085 | A | 11/2019 |
| CN | 110797574 | A | 2/2020 |
| IN | 107017432 | A | 8/2017 |
| IN | 110943250 | A | 3/2020 |
| JP | 2001202992 | A | 7/2001 |
| JP | 200816422 | A | 1/2008 |
| JP | 2015522209 | A | 8/2015 |
| WO | 2019182013 | A1 | 9/2019 |

OTHER PUBLICATIONS

Office Action issued on Jan. 21, 2025, in corresponding Japanese Application No. 2023-528338, 14 pages.

Office Action issued on Feb. 12, 2023, in corresponding Chinese Application No. 202080012534.X, 14 pages.

Office Action issued on Jul. 1, 2023, in corresponding Chinese Application No. 202080012534.X, 10 pages.

Office Action issued on Sep. 19, 2023, in corresponding Chinese Application No. 202080012534.X, 16 pages.

Yan et al., "Beneficial effects of 1-propylphosphonic acid cyclic anhydride as an electrolyte additive on the electrochemical properties of LiNi0.5Mn1.5O4cathode material", Journal of Power Sources, Oct. 2014, vol. 263, pp. 231-238.

* cited by examiner

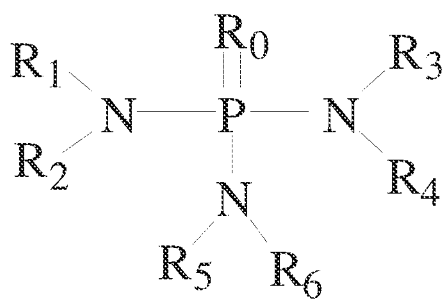

ELECTROLYTE, ELECTROCHEMICAL DEVICE AND ELECTRONIC DEVICE

CROSS REFERENCE TO RELATED APPLICATIONS

This application is a continuation application of PCT/CN2020/128359, filed on Nov. 12, 2020, the disclosure of which is hereby incorporated by reference in its entirety.

TECHNICAL FIELD

This application relates to the field of electrochemical technologies, in particular to an electrolyte, an electrochemical device using the electrolyte, and an electronic device.

BACKGROUND

Lithium cobalt oxide (LCO) is superior to other ternary cathode materials such as lithium manganate and lithium iron phosphate in terms of compaction density, high voltage, high capacity, high temperature resistance and the like, and has been the preferred cathode material for batteries of consumer electronics (referred to as 3C electronics) such as cell phones, notebook computers, and digital cameras. With the development of the 3C electronics and the advent of the 5G era, high energy density has become an inevitable trend. Researchers have increased the specific capacity of the LCO by increasing the charge cut-off voltage of LCO and allowing more ions to participate in charging and discharging.

It is well known that the LCO of a layered structure is composed of lithium (Li) ions and cobalt (Co) ions which are alternately arranged among a skeleton composed of negative oxygen ions. In case of no lithium intercalation or deintercalation, the rule that positive and negative ions are alternately arranged is maintained inside a crystal structure, and the material structure is stable. However, when charging starts, the following reaction process occurs. Firstly, lithium ions of a cathode material start to deintercalate, after the lithium ions deintercalate, oxygen atoms of a Li layer lose the negative ion barrier to repel, and the surface structure becomes unstable. The lithium ions continue to deintercalate, the lattice oxygen activity at the surface increases to a certain degree and gas overflow occurs, resulting in the stability of Co atoms on the surface becoming less stable, dissolving and oxidizing an electrolyte, the high-temperature storage performance of the lithium ion batteries is poor, resulting in the expansion thickness of the batteries increasing, and the use safety problems occur. Especially, as the charge cut-off voltage rises, the amount of lithium deintercalating is greater, so activities of the oxygen atoms and Co elements become higher, and the deterioration of high temperature performance is further deteriorated. Therefore, it is urgent to develop lithium ion batteries with the good high temperature performance.

SUMMARY

In order to solve the problems in the prior art, this application provides an electrolyte.

One aspect of this application provides an electrolyte, including a fluoroethylene carbonate and a P—N bond-containing compound, and the P—N bond-containing compound includes a compound shown in Formula I:

Formula I

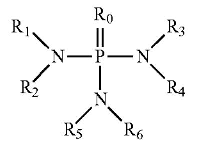

wherein $R_0$ represents $O_n$, wherein n is 0 or 1;

$R_1$, $R_2$, $R_3$, $R_4$, $R_5$, and $R_6$ are each independently selected from $C_1$-$C_6$ alkyl, $C_2$-$C_6$ alkenyl, $C_2$-$C_6$ alkynyl, or $C_1$-$C_6$ alkoxy;

or $R_1$ and $R_2$, $R_3$ and $R_4$, or $R_5$ and $R_6$ are interconnected to form, together with an N atom, a cyclic group with a carbon atom number of 2-5; and by mass of the electrolyte, a mass percentage of the fluoroethylene carbonate in the electrolyte is a %, a mass percentage of the P—N bond-containing compound in the electrolyte is b %, and $0.1 \leq a/b \leq 200$ is satisfied. In an embodiment of this application, the compound having a structure shown in Formula I includes at least one of a compound shown in Formula I-A or a compound shown in Formula I-B:

Formula I-A

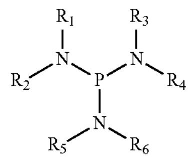

Formula I-B

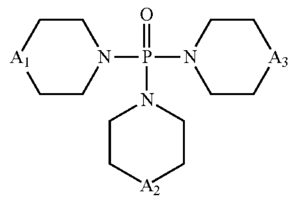

wherein $A_1$, $A_2$, and $A_3$ are each independently selected from a carbon atom, an oxygen atom, or a single bond.

In some embodiments of this application, the P—N bond-containing compound includes at least one of compounds shown below:

Formula 1-1

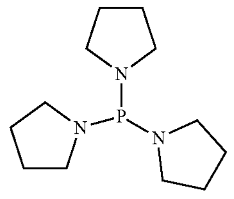

Formula 1-2

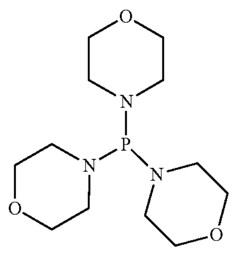

-continued

Formula 1-3

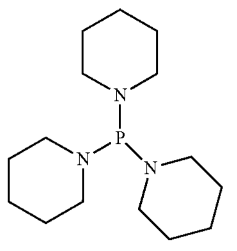

Formula 1-4

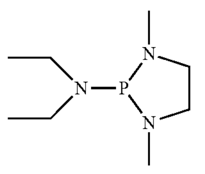

Formula 1-5

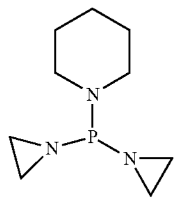

Formula 1-6

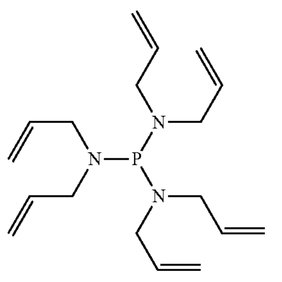

Formula 1-7

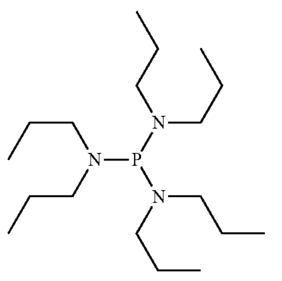

Formula 1-8

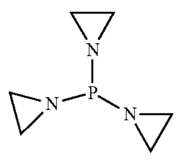

Formula 1-9

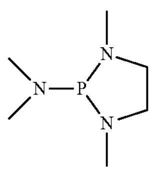

-continued

Formula 1-10

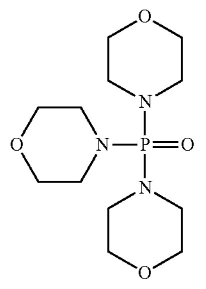

Formula 1-11

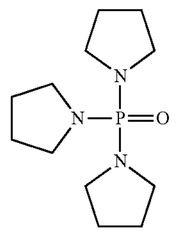

Formula 1-12

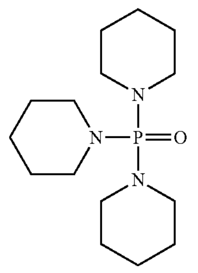

Formula 1-13

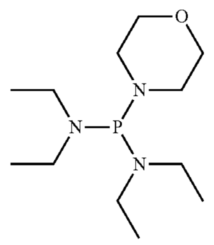

Formula 1-14

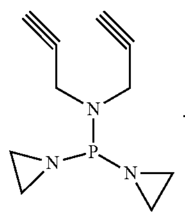

In some embodiments of this application, by mass of the electrolyte, the mass percentage of the P—N bond-containing compound in the electrolyte is 0.1%-5%.

In some embodiments of this application, the electrolyte further includes a sulfur-containing compound shown in Formula II:

Formula II

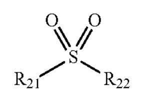

wherein $R_{21}$ and $R_{22}$ are each independently selected from straight-chain or branched-chain substituted or unsubstituted $C_1$-$C_6$ alkyl, substituted or unsubstituted $C_3$-$C_6$ cycloalkyl, substituted or unsubstituted $C_1$-$C_6$ alkoxy, substituted or unsubstituted $C_2$-$C_6$ alkenyl, substituted or unsubstituted $C_2$-$C_6$ alkynyl, sulfuryl, silyl, a cyano group, or $R_{23}O$—; a substituent group is a halogen atom; and $R_{23}$ is $C_1$-$C_6$ alkyl, substituted or unsubstituted $C_3$-$C_6$ cycloalkyl, or substituted or unsubstituted $C_3$-$C_6$ heterocyclyl;

or $R_{21}$ and $R_{22}$ are interconnected to form, together with the sulfuryl, a substituted or unsubstituted cyclic group with a carbon atom number of 3-4.

In some embodiments of this application, the sulfur-containing compound includes one or more of the following compounds:

Formula II-1

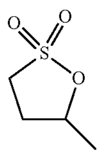

Formula II-2

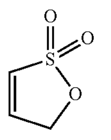

Formula II-3

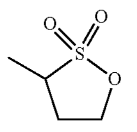

Formula II-4

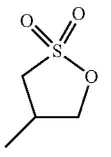

Formula II-5

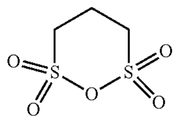

Formula II-6

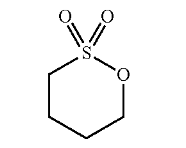

Formula II-7

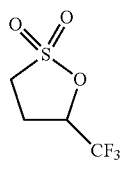

Formula II-8

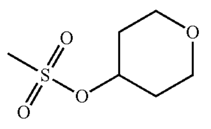

-continued

Formula II-9

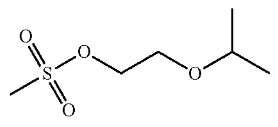

Formula II-10

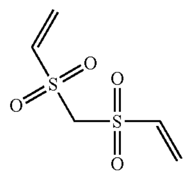

Formula II-11

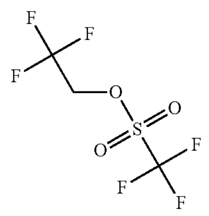

Formula II-12

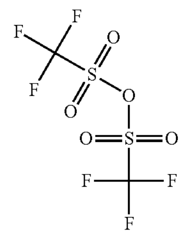

Formula II-13

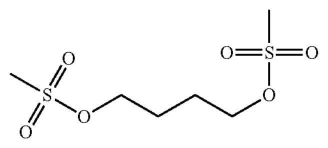

Formula II-14

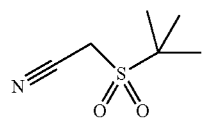

Formula II-15

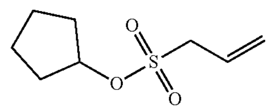

Formula II-16

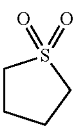

Formula II-17

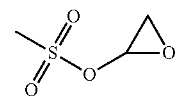

Formula II-18

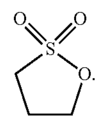

In some embodiments of this application, a mass percentage of the sulfur-containing compound shown in Formula II in the electrolyte is 1%-6%.

In some embodiments of this application, the electrolyte further includes a phosphoric acid cyclic anhydride compound, and the phosphoric acid cyclic anhydride compound includes a compound shown in Formula III:

Formula III

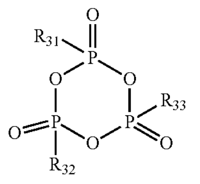

wherein $R_{31}$, $R_{32}$, and $R_{33}$ are each independently selected from H, substituted or unsubstituted $C_1$-$C_5$ saturated alkyl, substituted or unsubstituted $C_2$-$C_{10}$ unsaturated alkyl, or a $C_6$-$C_{15}$ aromatic ring. For example, the substituted or unsubstituted $C_1$-$C_5$ saturated alkyl includes, but is not limited to, methyl, methylene, ethyl, n-propyl, isopropyl, n-butyl, isobutyl, and the like. The substituted or unsubstituted $C_2$-$C_{10}$ unsaturated alkyl includes, but is not limited to, vinyl, propenyl, cyclopropenyl, 1-butenyl, 3-pentenyl, propargyl, and the like.

In some embodiments of this application, the phosphoric acid cyclic anhydride compound includes one or more of the following compounds:

Formula III-1

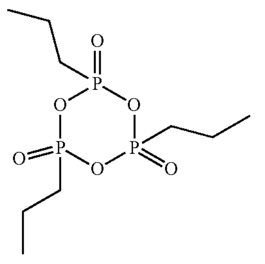

Formula III-2

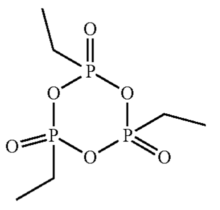

Formula III-3

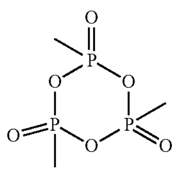

-continued

Formula III-4

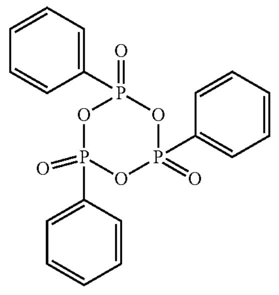

Formula III-5

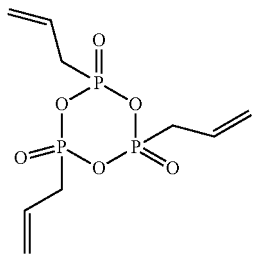

Formula III-6

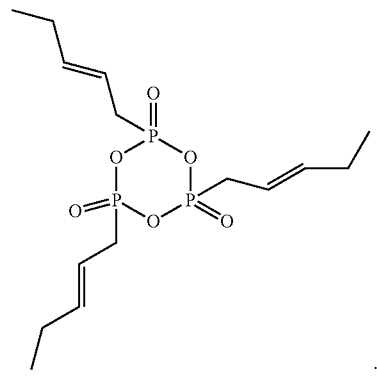

In some embodiments of this application, by mass of the electrolyte, a mass percentage of the phosphoric acid cyclic anhydride compound in the electrolyte is 0.01%-3%. For example, a content of the phosphoric acid cyclic anhydride compound may be 0.01%, 0.05%, 0.1%, 0.2%, 0.3%, 0.4%, 0.5%, 0.6%, 0.7%, 0.8%, 0.9%, 1.0%, 1.3%, 1.5%, 2.0%, 3.0%, or a range between any two of these values.

A lithium ion battery according to a second aspect of this application is described next.

Another aspect of this application provides an electrochemical device, including a cathode plate, an anode plate, an isolation film spaced between the cathode plate and the anode plate, an electrolyte, and a packaging foil. The cathode plate includes a cathode current collector and a cathode active material layer coated on the cathode current collector, the cathode active material layer includes a cathode active material, the anode plate includes an anode current collector and an anode active material layer coated on the anode current collector, and the anode active material layer includes an anode active material. The electrolyte is the electrolyte as described in this application.

In some embodiments of this application, by g/Ah, a ratio W:K of a content value W of a compound of Formula I required per Ah capacity to K is 0.12 to 1.15, wherein K represents a value of a specific surface area per unit mass of an anode active substance by $m^2/g$, and $1.0 \le K \le 2.0$ is satisfied.

This application further provides an electronic device, including the electrochemical device as described above.

The technical solution provided by this application can achieve the following beneficial effects:

the electrolyte of this application includes the P—N bond-containing compound in Formula I, which can improve the stability of the electrolyte on the surface of the cathode active material. Meanwhile, the compound can also absorb oxygen released from a cathode, inhibit electrolyte decomposition, reduce gas production, and effectively improve the high-temperature cycle and high-temperature storage performances of the lithium ion battery.

BRIEF DESCRIPTION OF THE DRAWING

FIGURE shows the structure of a P—N bond-containing compound according to Formula I.

DETAILED DESCRIPTION

In order to make the objectives, technical solutions and advantages of this application clearer, the technical solutions of this application will be clearly and completely described below in combination with embodiments, and obviously, the embodiments described are some, but not all, of the embodiments of this application. The relevant embodiments described herein are illustrative in nature and are intended to provide a basic understanding of this application. The embodiments of this application should not be construed as limiting this application. Based on the technical solutions provided in this application and the given embodiments, all other embodiments obtained by a person skilled in the art without creative labor fall within the scope of protection of this application.

In specific implementations and claims, a list of items connected by the terms "one of", "one in", "one kind of", or other similar terms may imply any of the listed items. For example, if items A and B are listed, then the phrase "one of A and B" means A only or B only. In another example, if items A, B, and C are listed, then the phrase "one of A, B, and C" means A only; B only; or C only. Item A may contain a single component or a plurality of components. Item B may contain a single component or a plurality of components. Item C may contain a single component or a plurality of components.

In specific implementations and claims, a list of items connected by the terms "at least one of", "at least one in", "at least one kind of", or other similar terms may imply any combination of the listed items. For example, if items A and B are listed, then the phrase "at least one of A and B" means A only; B only; or A and B. In another example, if items A, B, and C are listed, then the phrase "at least one of A, B, and C" means A only; B only; C only; A and B (excluding C); A and C (excluding B); B and C (excluding A); or A, B and C. Item A may contain a single component or a plurality of components. Item B may contain a single component or a plurality of components. Item C may contain a single component or a plurality of components.

The following definitions are used in this application (unless otherwise expressly stated).

For simplicity, a "$C_n$-$C_m$" group is a group having "n" to "m" carbon atoms, wherein "n" and "m" are integers. For example, "$C_1$-$C_{10}$" alkyl is alkyl with 1 to 10 carbon atoms.

As used herein, the term "halogen" may be F, Cl, Br, or I.

As used herein, the term "cyano group" covers organic substances containing an organic group —CN.

In order to solve the problems in the prior art, this application provides an electrolyte.

I. Electrolyte

One aspect of this application provides an electrolyte, including a fluoroethylene carbonate (FEC) and a P—N bond-containing compound, and the P—N bond-containing compound includes a compound shown in Formula I:

Formula I

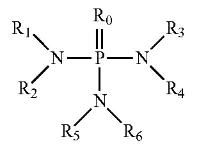

wherein $R_0$ represents $O_n$, wherein n is 0 or 1;

$R_1$, $R_2$, $R_3$, $R_4$, $R_5$, and $R_6$ are each independently selected from $C_1$-$C_6$ alkyl, $C_2$-$C_6$ alkenyl, $C_2$-$C_6$ alkynyl, or $C_1$-$C_6$ alkoxy;

or $R_1$ and $R_2$, $R_3$ and $R_4$, or $R_5$ and $R_6$ are interconnected to form, together with an N atom, a cyclic group with a carbon atom number of 2-5; and by mass of the electrolyte, a mass percentage of the fluoroethylene carbonate in the electrolyte is a %, a mass percentage of the P—N bond-containing compound in the electrolyte is b %, and $0.1 \leq a/b \leq 200$ is satisfied.

When $R_0$ is not present, a double bond corresponding to $R_0$ is not present either.

In an embodiment of this application, $0.1 \leq a/b \leq 150$ is satisfied. When $0.1 \leq a/b \leq 150$, the more excellent high temperature performance can be obtained.

In an embodiment of this application, the compound having a structure shown in Formula I includes at least one of a compound shown in Formula I-A or a compound shown in Formula I-B:

Formula I-A

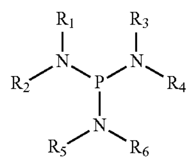

Formula I-B

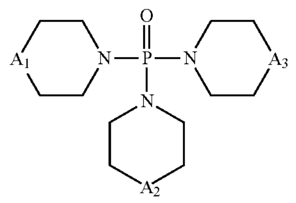

wherein $A_1$, $A_2$, and $A_3$ are each independently selected from a carbon atom, an oxygen atom, or a single bond. These groups or single bonds do not include active hydrogen atoms, avoiding battery gas production and battery performance deterioration.

In some embodiments of this application, the P—N bond-containing compound includes at least one of compounds shown below:

-continued
Formula 1-1
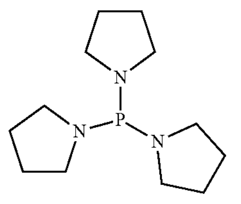
Formula 1-2
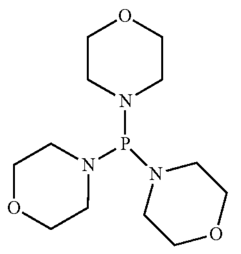
Formula 1-3
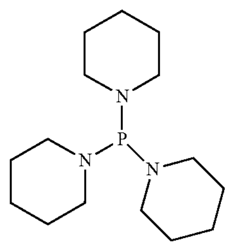
Formula 1-4
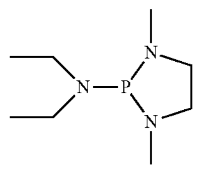
Formula 1-5
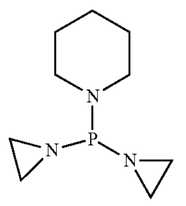
Formula 1-6
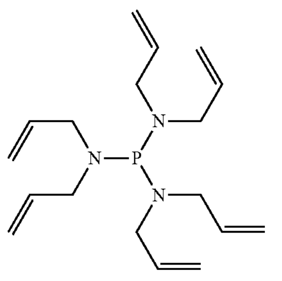
Formula 1-7
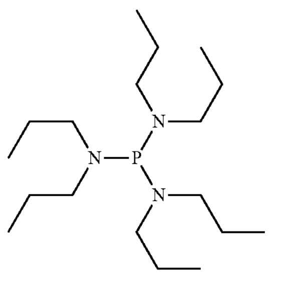
Formula 1-8
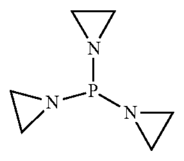
Formula 1-9
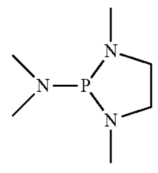
Formula 1-10
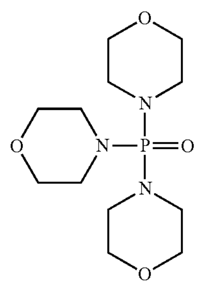
Formula 1-11
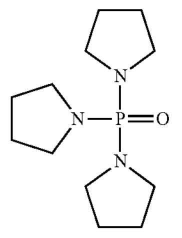
Formula 1-12
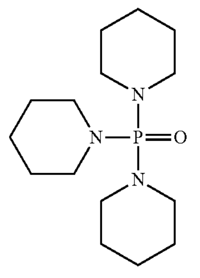
Formula 1-13
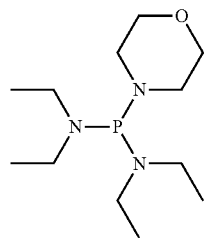
Formula 1-14
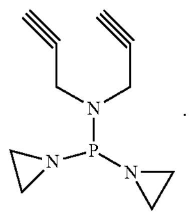
.

In some embodiments of this application, by mass of the electrolyte, the mass percentage of the P—N bond-containing compound in the electrolyte is 0.1%-5%. When a content of phosphorus-containing additives is lower than 0.1%, a formed protective film is not sufficient and has little effect on battery performance. When the content is higher than 5%, the formed film has high impedance and affects battery performance.

In some embodiments of this application, by mass of the electrolyte, the mass percentage of the P—N bond-containing compound in the electrolyte is 0.1%-3%. For example, a content of the P—N bond-containing compound may be 0.1%, 0.2%, 0.3%, 0.4%, 0.5%, 0.6%, 0.7%, 0.8%, 0.9%, 1.0%, 1.5%, 2.0%, 2.5%, 3.0%, or a range between any two of these values.

In some embodiments of this application, the electrolyte further includes a sulfur-containing compound shown in Formula II:

Formula II

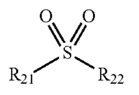

wherein $R_{21}$ and $R_{22}$ are each independently selected from straight-chain or branched-chain substituted or unsubstituted $C_1$-$C_6$ alkyl, substituted or unsubstituted $C_3$-$C_6$ cycloalkyl, substituted or unsubstituted $C_1$-$C_6$ alkoxy, substituted or unsubstituted $C_2$-$C_6$ alkenyl, substituted or unsubstituted $C_2$-$C_6$ alkynyl, sulfuryl, silyl, a cyano group, or $R_{23}O$—; a substituent group is a halogen atom; and $R_{23}$ is $C_1$-$C_6$ alkyl, substituted or unsubstituted $C_3$-$C_6$ cycloalkyl, or substituted or unsubstituted $C_3$-$C_6$ heterocyclyl;

or $R_{21}$ and $R_{22}$ are interconnected to form, together with the sulfuryl, a substituted or unsubstituted $C_3$-$C_4$ cyclic group with a carbon atom number of 3-4.

In some embodiments of this application, the sulfur-containing compound includes one or more of the following compounds:

Formula II-1

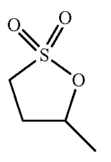

Formula II-2

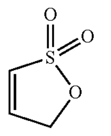

Formula II-3

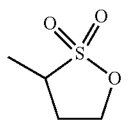

Formula II-4

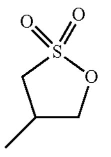

-continued

Formula II-5

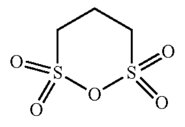

Formula II-6

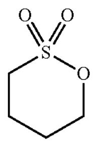

Formula II-7

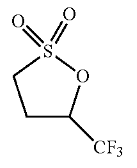

Formula II-8

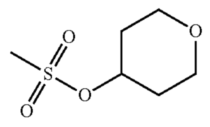

Formula II-9

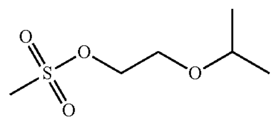

Formula II-10

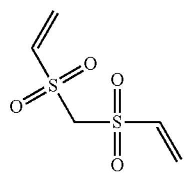

Formula II-11

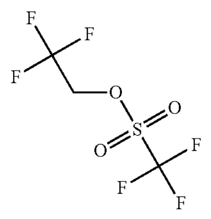

Formula II-12

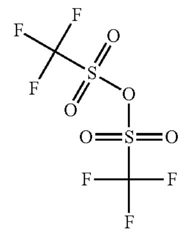

Formula II-13

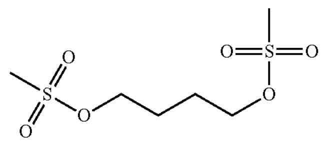

Formula II-14

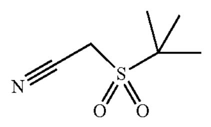

-continued

Formula II-15

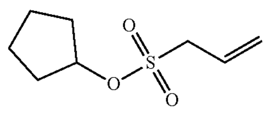

Formula II-16

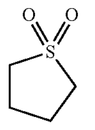

Formula II-17

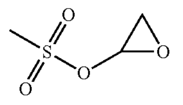

Formula II-18

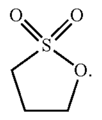

In some embodiments of this application, a mass percentage of the sulfur-containing compound shown in Formula II in the electrolyte is 1%-6%. For example, a content of the sulfur-containing compound shown in structural formula II may be 1%, 1.5%, 1.8%, 2.0%, 2.2%, 2.4%, 2.5%, 3%, 3.2%, 3.5%, 3.7%, 4.0%, 4.5%, 5.0%, 5.5%, 6.0%, or a range between any two of these values.

The sulfur-containing compound has higher film-forming potentials for both cathode and anode, a formed interface film has excellent thermal stability and is rich in lithium ion conducting group, and through synergy with the phosphorus-containing compound in Formula I, the interface stability of a cathode surface layer can be greatly improved, a cathode interface is protected, electrolyte consumption is inhibited, and the high-temperature cycle and high-temperature storage performances of a battery are improved.

In some embodiments of this application, the electrolyte further includes a phosphoric acid cyclic anhydride compound, and the phosphoric acid cyclic anhydride compound includes a compound shown in Formula III:

Formula III

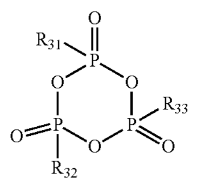

wherein $R_{31}$, $R_{32}$, and $R_{33}$ are each independently selected from H, substituted or unsubstituted $C_1$-$C_5$ saturated alkyl, substituted or unsubstituted $C_2$-$C_{10}$ unsaturated alkyl, or a $C_6$-$C_{18}$ aromatic ring. For example, the substituted or unsubstituted $C_1$-$C_5$ saturated alkyl includes, but is not limited to, methyl, methylene, ethyl, n-propyl, isopropyl, n-butyl, isobutyl, and the like. The substituted or unsubstituted $C_2$-$C_{10}$ unsaturated alkyl includes, but is not limited to, vinyl, propenyl, cyclopropenyl, 1-butenyl, 3-pentenyl, propargyl, and the like.

In some embodiments of this application, the phosphoric acid cyclic anhydride compound includes one or more of the following compounds:

Formula III-1

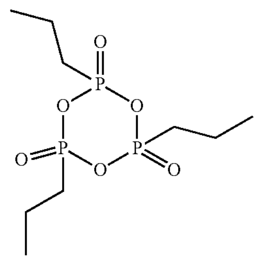

Formula III-2

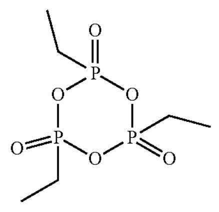

Formula III-3

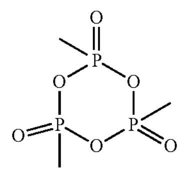

Formula III-4

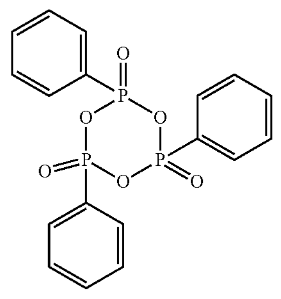

Formula III-5

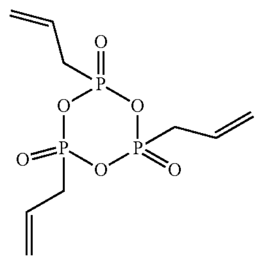

Formula III-6

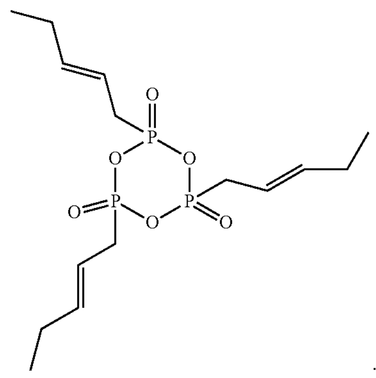

In some embodiments of this application, by mass of the electrolyte, a mass percentage of the phosphoric acid cyclic anhydride compound in the electrolyte is 0.01%-3%. For example, a content of the phosphoric acid cyclic anhydride compound may be 0.01%, 0.05%, 0.1%, 0.2%, 0.3%, 0.4%, 0.5%, 0.6%, 0.7%, 0.8%, 0.9%, 1.0%, 1.3%, 1.5%, 2.0%, 3.0%, or a range between any two of these values.

The phosphoric acid cyclic anhydride compound can react with components in an SEI film formed at an anode interface in a complex manner, which contributes to forming a more stable SEI film at the interface film, and can significantly reduce the impedance of the anode interface film, and through synergy with the above additives, the lithium ion battery has good high-temperature cycle and high-temperature storage performances and low impedance.

In some embodiments of this application, a lithium salt is selected from an inorganic lithium salt and/or an organic lithium salt.

Preferably, the lithium salt is selected from one or more of lithium hexafluorophosphate (LiPF6), lithium tetrafluoroborate (LiBF4), lithium bis(fluorosulfonyl)imide (LiFSI), lithium bis(trifluoromethanesulfonyl)imide (LiTFSI), lithium bis(oxalate)borate (LiBOB), and lithium difluoro (oxalato)borate (LiDFOB).

In some embodiments of this application, a concentration of the lithium salt in the electrolyte is 0.6 mol/L-2 mol/L.

II. Electrochemical Device

This application further provides an electrochemical device, including the electrolyte according to this application.

A lithium ion battery according to a second aspect of this application is described next.

Another aspect of this application provides an electrochemical device, including a cathode plate, an anode plate, an isolation film spaced between the cathode plate and the anode plate, an electrolyte, and a packaging foil. The cathode plate includes a cathode current collector and a cathode active material layer coated on the cathode current collector, the cathode active material layer includes a cathode active material, the anode plate includes an anode current collector and an anode active material layer coated on the anode current collector, and the anode active material layer includes an anode active material. The electrolyte is the electrolyte as described in this application.

In some embodiments of this application, by g/Ah, a ratio W:K of a content value W of a compound of Formula I required per Ah capacity to K is 0.12 to 1.15;

wherein K represents a value of a specific surface area per unit mass of an anode active substance by $m^2/g$, and $1.0 \le K \le 2.0$ is satisfied.

The specific surface area of the anode active substance may be achieved by controlling selection of the anode active material.

This application further provides an electronic device, including the electrochemical device as described above.

The technical solution provided by this application can achieve the following beneficial effects:

the electrolyte of this application includes the P—N bond-containing compound in Formula I, which can improve the stability of the electrolyte on the surface of the cathode active material. Meanwhile, the compound can also absorb oxygen released from a cathode, inhibit electrolyte decomposition, reduce gas production, and effectively improve the high-temperature cycle and high-temperature storage performances of the lithium ion battery.

Embodiment

This application is further described below in combination with embodiments. It should be understood that these embodiments are intended to illustrate this application only and are not intended to limit the scope of this application.

Preparation of an electrolyte: in an argon atmosphere glove box with a water content <10 ppm, ethylene carbonate (EC), ethyl methyl carbonate (EMC), and diethyl carbonate (DEC) are mixed according to a mass ratio of EC:EMC:DEC=30:50:20, then a sufficiently dried lithium salt $LiPF_6$ is dissolved in the above non-aqueous solvent with a $LiPF_6$ content of 1 mol/L, and finally a certain mass of additives is added to formulate the electrolyte of the embodiment.

As shown in Table 1, a compound containing Formula I or other matched additives are added to a base electrolyte.

Preparation of an electrolyte: in an argon atmosphere glove box with a water content <10 ppm, ethylene carbonate (abbreviated as EC), diethyl carbonate (abbreviated as DEC), and propylene carbonate (abbreviated as PC) are mixed uniformly according to a mass ratio of 3:4:3, then a sufficiently dried lithium salt $LiPF_6$ is dissolved in the above non-aqueous solvent, and finally a certain mass of additives is added to formulate the electrolyte of the embodiment.

As shown in Table 1, phosphorus-containing additives, linear or cyclic sulfur-containing compounds, and cyclic phosphate ester additives are added to a base electrolyte.

1. Battery Preparation (1) Cathode Plate Preparation

Lithium cobalt oxide, a conductive agent Super P, and polyvinylidene fluoride are mixed according to a mass ratio of 96:2:2, N-methylpyrrolidone is added, and a mixture is stirred under the action of a vacuum mixer until the system is uniform to obtain a cathode slurry, wherein a solid content of the cathode slurry is 75 wt %; the cathode slurry is uniformly coated on a cathode current collector aluminum foil; and the aluminum foil is dried at 85° C., and then after cold pressing, cutting and slitting, the aluminum foil is dried under vacuum at 85° C. for 4 h to obtain a cathode plate.

(2) Anode Plate Preparation

Artificial graphite, sodium carboxymethyl cellulose (abbreviated as CMC), and styrene butadiene rubber (abbreviated as SBR) are mixed according to a mass ratio of 97:1:2, deionized water is added, and an anode slurry is obtained under the action of the vacuum mixer, wherein a solid content of the anode slurry is 54 wt %; the anode slurry is uniformly coated on an anode current collector copper foil; and the copper foil is dried at 85° C., and then after cold pressing, cutting and slitting, the copper foil is dried under vacuum at 120° C. for 12 h to obtain an anode plate.

(3) Electrolyte Preparation

In a dry argon atmosphere glove box, ethylene carbonate (abbreviated as EC), diethyl carbonate (abbreviated as DEC), and propylene carbonate (abbreviated as PC) are mixed according to a mass ratio of 3:4:3, then additives are added, dissolved and stirred thoroughly, then a lithium salt $LiPF_6$ is added, and the mixture is mixed uniformly to obtain an electrolyte. A concentration of $LiPF_6$ is 1.15 mol/L. The specific types and contents of the additives used in the electrolyte are shown in Tables 1, 2 and 3. The content of the additives is a mass percentage calculated based on the mass of the electrolyte.

(4) Isolation Film Preparation

A 7 μm thick polyethylene (PE) isolation film is selected.

(5) Preparation of Lithium Ion Battery

The cathode plate, the isolation film, and the anode plate are stacked in order so that the isolation film is between the cathode plate and the anode plate to play a role of isolation, and then are rolled to obtain a bare cell. The bare cell is placed in an outer packaging foil aluminum plastic film after a tab is welded, the electrolyte prepared above is injected into the dried bare cell, and after vacuum encapsulation, standing, formation (charging to 3.3 V at 0.02 C constant current, and then charging to 3.6 V at 0.1 C constant current), shaping, capacity testing and other processes, a pouch lithium ion battery (3.3 mm thick, 39 mm wide, and 96 mm long) is obtained.

2. Test Method

Test I: Lithium Ion Battery High-Temperature Storage Performance Test

The battery is discharged at 0.5 C to 3.0 V at 25° C., charged at 0.7 C constant current to 4.45V, charged at 4.45 V constant voltage to a current of 0.05 C, and tested with a micrometer, and a thickness of the battery is recorded as $H_{11}$. The battery is stored at 85° C. for 24 hours on full charge, and tested with the micrometer at the end of 24 hours, and a thickness of the battery is recorded as $H_{12}$.

$$\text{Thickness swelling rate}=(H_{12}-H_{11})/H_{11}\times 100\%$$

Test II: Lithium Ion Battery High-Temperature Cycle Test

The lithium ion battery is placed in a 45° C. thermostat and left to stand for 30 minutes to bring the lithium ion battery to a constant temperature. The lithium ion battery at the constant temperature is discharged at 0.2 C constant current to 3.0 V at 45° C. and left to stand for 3 minutes; then the battery is charged at 0.7 C constant current to 4.45 V, then charged at 4.45V constant voltage to a current of 0.025 C and left to stand for 5 minutes; then the battery is discharged at 0.2 C constant current to a voltage of 3.0 V and left to stand for 3 minutes; and this is a charge and discharge cycle. Through this charge/discharge, a capacity retention rate of the battery after 500 cycles is calculated.

$$\text{Capacity retention rate (\%) of the lithium ion battery after 500 cycles}=\text{Discharge capacity of the 500th cycle}/\text{Discharge capacity of the 1st cycle}\times 100\%$$

Test III. Lithium Ion Battery Direct Current Impedance DCR (0° C.) Test

The lithium ion battery is put in a high-low temperature chamber at 0° C. to stand for 4 hours to bring the lithium ion battery to a constant temperature; the battery is charged at 0.1 C constant current to 4.45 V, charged at a constant voltage to a current of 0.05 C, and left to stand for 10 minutes; and then the battery is discharged at 0.1 C constant current to 3.4 V, and left to stand for 5 minutes, and the capacity at this step is used as a benchmark. The battery is charged to 4.45 V at 0.1 C constant current under the condition of 0° C., charged at a constant voltage to a current of 0.05 C, and left to stand for 10 minutes; the battery is discharged at 0.1 C constant current for 8 h (calculated by using the actual capacity obtained at the previous step), and a voltage at this time is recorded as $V_1$; and then the battery is discharged at 1 C constant current for is (a capacity is calculated by using a battery labeled capacity), a voltage at this time is recorded as $V_2$, and a direct current impedance corresponding to a 20% SOC state is calculated.

$$\text{20\% SOC direct current impedance}=(V_2-V_1)/(1C-0.1C)$$

3. Test Result (1) Effect of a P—N Containing Additive and a Fluoroethylene Carbonate Additive on Battery Performance

TABLE 1

Electrolyte parameters and electrical performance data of Embodiments 1-16 and Comparative embodiments 1-4

| | Electrolyte | | | | 45° C. cycle capacity | 85° C.-24 h |
|---|---|---|---|---|---|---|
| | Compound of Formula I | Content b (%) | FEC Content a (%) | a/b | retention rate (500 times) | Thickness swelling rate (%) |
| Embodiment 1 | I-10 | 0.01 | 2 | 200 | 73.0% | 16.2 |
| Embodiment 2 | I-10 | 0.05 | 4 | 80 | 76.2% | 15.4 |
| Embodiment 3 | I-10 | 0.1 | 7 | 70 | 80.3% | 14.8% |
| Embodiment 4 | I-10 | 0.3 | 7 | 23.3 | 80.60% | 12.8 |
| Embodiment 5 | I-10 | 0.5 | 7 | 14 | 83.20% | 11.5 |
| Embodiment 6 | I-10 | 1 | 7 | 7 | 82.30% | 12.1 |
| Embodiment 7 | I-10 | 2 | 7 | 3.5 | 79.70% | 12.9 |
| Embodiment 8 | I-10 | 3 | 7 | 2.33 | 78.80% | 13.5 |
| Embodiment 9 | I-10 | 5 | 7 | 1.4 | 77.40% | 14.3 |
| Embodiment 10 | I-10 | 0.2 | 5 | 25 | 83.40% | 11.3 |
| Embodiment 11 | I-10 | 0.3 | 10 | 33.3 | 84.70% | 11.7 |
| Embodiment 12 | I-3 | 0.5 | 3 | 6 | 80.3 | 12.1 |
| Embodiment 13 | I-7 | 0.5 | 4 | 8 | 81.30% | 11.5 |
| Embodiment 14 | I-5 | 0.5 | 8 | 16 | 80.7% | 12.5 |

TABLE 1-continued

Electrolyte parameters and electrical performance data of Embodiments 1-16 and Comparative embodiments 1-4

| | Electrolyte | | | | 45° C. cycle capacity retention rate (500 times) | 85° C.-24 h Thickness swelling rate (%) |
|---|---|---|---|---|---|---|
| | Compound of Formula I | Content b (%) | FEC Content a (%) | a/b | | |
| Embodiment 15 | I-9 | 0.5 | 9 | 18 | 81.20% | 11.7 |
| Embodiment 16 | I-12 | 0.5 | 12 | 24 | 80.90% | 12.5 |
| Comparative embodiment 1 | / | / | / | / | 55.60% | 30.5 |
| Comparative Embodiment 2 | I-10 | 1 | / | / | 61.5% | 20.5 |
| Comparative Embodiment 3 | I-10 | 3 | 0.1 | 0.03 | 66.00% | 19.3 |
| Comparative Embodiment 4 | I-10 | 0.009 | 2 | 222.2 | 64.00% | 20.3 |

By comparing Comparative Embodiment 1 with Comparative Embodiment 2, it can be seen that the addition of the P—N bond-containing compound has a better improvement effect on improving the high-temperature cycle and high-temperature storage. The reason is that the P—N bond-containing compound can improve the stability of the electrolyte on the surface of the active material, and at the same time can absorb oxygen released from the cathode, inhibit electrolyte decomposition and reduce gas production, which can effectively improve the high-temperature cycle and high-temperature storage performances of the lithium ion battery. By comparing Embodiments 1-9 respectively, it can be seen that when the P—N bond-containing compound (content of b %) is used in combination with the FEC (content of a %) and $0.1 \le a/b \le 200$ is satisfied at the same time, the high-temperature storage and cycle performances can be further improved.

By comparing Embodiments 1-16 and Comparative Embodiments 3-4, it can be seen that when $a/b \le 0.1$, the high-temperature cycle improvement is not significant, and this is because the LiF content in the anode is low and a formed SEI film has poor mechanical stability, which is not conducive to the improvement of cycle. When $a/b > 200$, the high-temperature cycle improvement is significant, but the deterioration of high-temperature storage is more obvious, and this is because when the FEC content is too high, the battery is prone to being oxidized and decomposed to produce gas, which deteriorates the high-temperature storage performance.

(2) Effect of a P—N Containing Additive and an S-Containing Additive on Battery Performance

TABLE 2

Electrolyte parameters and electrical performance data of Embodiments 17-29 and Comparative Embodiment 5

| | Electrolyte | | | | | | 45° C. cycle capacity retention rate (500 times) | 85° C.-24 h Thickness swelling rate (%) |
|---|---|---|---|---|---|---|---|---|
| | Compound of Formula I | Content b (%) | FEC Content a (%) | a/b | Compound of Formula II | Content (%) | | |
| Embodiment 6 | I-10 | 1 | 7 | 7 | / | / | 82.30% | 12.1 |
| Embodiment 17 | I-10 | 1 | 7 | 7 | II-2 | 3 | 82.20% | 11.5 |
| Embodiment 18 | I-10 | 1 | 7 | 7 | II-6 | 3 | 82.60% | 11.3 |
| Embodiment 19 | I-10 | 1 | 7 | 7 | II-5 | 3 | 82.70% | 11.9 |
| Embodiment 20 | I-10 | 1 | 7 | 7 | II-8 | 3 | 82.50% | 11.0 |
| Embodiment 21 | I-10 | 1 | 7 | 7 | II-17 | 3 | 82.40% | 11.3 |
| Embodiment 22 | I-10 | 1 | 7 | 7 | II-1 | 1 | 81.90% | 12.0 |

TABLE 2-continued

Electrolyte parameters and electrical performance data of Embodiments 17-29 and Comparative Embodiment 5

| | Electrolyte | | | | | | 45° C. cycle capacity retention | 85° C.-24 h |
|---|---|---|---|---|---|---|---|---|
| | Compound of Formula I | Content b (%) | FEC Content a (%) | a/b | Compound of Formula II | Content (%) | rate (500 times) | Thickness swelling rate (%) |
| Embodiment 23 | I-10 | 1 | 7 | 7 | II-1 | 3 | 82.90% | 11.5 |
| Embodiment 24 | I-2 | 1 | 7 | 7 | II-1 | 4 | 84.90% | 10.2 |
| Embodiment 25 | I-8 | 1.5 | 9 | 6 | II-1 | 6 | 85.20% | 10 |
| Embodiment 26 | I-8 | 1.5 | 9 | 6 | II-1 | 8 | 80.90% | 13.5 |
| Embodiment 27 | I-10 | 1 | 7 | 7 | II-2 + II-18 | 2 + 1 | 84.10% | 10.9 |
| Embodiment 28 | I-10 | 1 | 7 | 7 | II-2 + II-5 | 2 + 1 | 85.10% | 10.2 |
| Embodiment 29 | I-10 | 1 | 7 | 7 | II-2 + II-5 | 2 + 0.5 | 84.7% | 11.3 |
| Comparative Embodiment 5 | / | / | / | / | II-1 | 3 | 68.5% | 20.5 |

By comparing Embodiments 17-22 with Embodiment 6 and Comparative Embodiment 5, it can be seen that the addition of the compound of Formula II has a better improvement effect on improving the high-temperature cycle and high-temperature storage. The reason is that the introduction of the compound of Formula II can further improve the stability of the SEI interface film, which in turn improves the stability of the electrolyte on the surface of the active material, inhibits electrolyte decomposition, reduces gas production, and can effectively improve the high-temperature cycle and high-temperature storage performances of the lithium ion battery.

By comparing Embodiments 23-26, it can be seen that different compounds of Formula I can achieve similar effects in synergy with the compounds of Formula II; however, when the addition of the compounds of Formula II is too high, the high-temperature storage performance is affected, and this is mainly because a protective film formed by the cathode and the anode is too thick, which leads to impedance increase and affects the electrical performance.

By comparing Embodiments 27-29, it can be seen that the similar improvement effect can be achieved by using different compounds of Formula II in combination.

(3) Effect of Synergy of a P—N Containing Additive, an S-Containing Additive and Phosphoric Acid Cyclic Anhydride on Battery Performance Table 3 lists electrolyte parameters and electrical performance data of Embodiment 4, Embodiments 23, 30-41 and Comparative embodiment 6, and Embodiments 30-40 are that substances shown in Table 3 are added based on Embodiment 4.

TABLE 3

| | Compound of Formula II | | Compound of Formula III | | 45° C. cycle capacity retention | 85° C.-24 h Thickness | 20% SOC |
|---|---|---|---|---|---|---|---|
| | Composition | Content (wt %) | Composition | Content (wt %) | rate (500 times) | swelling rate (%) | DCR (mΩ) |
| Comparative Embodiment 6 | / | / | III-1 | 1 | 50.40% | 35.50 | 97.5 |
| Embodiment 4 | / | / | / | / | 80.60% | 12.80 | 80.6 |
| Embodiment 23 | II-1 | 3 | / | / | 82.90% | 11.50 | 73.2 |
| Embodiment 30 | / | / | III-1 | 0.1 | 80.60% | 12.8 | 70.7 |
| Embodiment 31 | / | / | III-1 | 0.5 | 81.20% | 12.60 | 69.8 |
| Embodiment 32 | II-1 | 3 | III-1 | 0.01 | 84.50% | 11.3 | 63.5 |
| Embodiment 33 | II-1 | 3 | III-1 | 0.5 | 89.30% | 10.4 | 62.5 |
| Embodiment 34 | II-1 | 3 | III-1 | 1 | 90.50% | 10.2 | 60.5 |

TABLE 3-continued

| | Compound of Formula II | | Compound of Formula III | | 45° C. cycle capacity retention rate (500 times) | 85° C.-24 h Thickness swelling rate (%) | 20% SOC DCR (mΩ) |
|---|---|---|---|---|---|---|---|
| | Composition | Content (wt %) | Composition | Content (wt %) | | | |
| Embodiment 35 | II-1 | 3 | III-1 | 1.5 | 90.20% | 10.7 | 59.6 |
| Embodiment 36 | II-1 | 3 | III-1 | 3 | 88.50% | 11.5 | 55.5 |
| Embodiment 37 | II-1 + II-18 | 2 + 1 | III-1 | 1 | 91.30% | 9.5 | 53.3 |
| Embodiment 38 | II-5 + II-18 | 1 + 2 | III-1 | 1 | 92.20% | 9.7 | 53.7 |
| Embodiment 39 | II-1 + II-18 | 2 + 0.5 | III-1 | 1 | 91.10% | 10.1 | 54.4 |
| Embodiment 40 | II-1 + II-18 | 1 + 0.5 | III-1 | 1 | 90.70% | 10.3 | 53.9 |
| Embodiment 41 | II-1 | 3 | III-3 | 1 | 89.60% | 10.7 | 61.2 |

By comparing test results of Embodiment 23, Embodiments 30-41 and Embodiment 4, it can be seen that the synergy of Formula I, Formula II and Formula III can make the lithium ion battery have a higher high-temperature cycle capacity retention rate and a lower high-temperature storage volume expansion rate at the same time, and the lithium ion battery also has low room-temperature direct current impedance. That is, the synergy of the three compounds can play the role of the compound of Formula I to improve the high-temperature performance of the lithium ion battery, and at the same time can prevent the damage of the compound of Formula I to the SEI film. From the test results of Embodiments 32-36, it can be seen that the low-temperature direct current impedance decreases gradually when the content of the compound of Formula III is within a suitable range, but when the content is too high, the high-temperature cycle capacity retention rate and the high-temperature storage volume expansion rate of the battery are affected.

From the test results of Comparative Embodiment 6 and Embodiments 30-41, it can be seen that the high-temperature cycle capacity retention rate and high-temperature storage volume expansion rate performances of the lithium ion battery are poor when only the additive of Formula III is added to the electrolyte, and this is because there is no cathode film-forming additive to protect the cathode, which causes the electrolyte to react with the cathode more easily and thus causes the performances of the lithium ion battery to become poor.

(4) Table 4 demonstrates effect of content of the compound of Formula I in the electrolyte on a high-temperature storage volume expansion rate and a capacity retention rate of the lithium ion battery. The embodiments shown in Table 4 are improvements on the basis of Embodiment 4.

TABLE 4

Effect of the content of the compound of Formula I on a high-temperature storage volume expansion rate and a capacity retention rate of the lithium ion battery

| | Electrolyte system | | | | | | | | | 85° C.-24 h Thickness swelling rate (%) | capacity retention rate |
|---|---|---|---|---|---|---|---|---|---|---|---|
| | I-10 (content of a) % | FEC (content of b) | a/b | II-1 | | | | | | | |
| Embodiment | | | | Composition | Content (%) | III-1 | W:K | W | K | | |
| Embodiment 4 | 0.3 | 7 | 23.3 | / | / | / | 0.8 | 1.2 | 1.5 | 12.8 | 80.60% |
| Embodiment 42 | 0.3 | 7 | 23.3 | / | / | 0.5 | 0.8 | 1.2 | 1.5 | 12.6 | 81.20% |
| Embodiment 43 | 0.3 | 7 | 23.3 | / | / | 1 | 0.8 | 1.2 | 1.5 | 12.2 | 83.0% |
| Embodiment 44 | 0.3 | 7 | 23.3 | II-1 | 3 | / | 0.8 | 1.2 | 1.5 | 11.5 | 82.90% |
| Embodiment 45 | 0.3 | 7 | 23.3 | II-1 + II-18 | 3 | / | 0.8 | 1.2 | 1.5 | 11.3 | 83.00% |
| Embodiment 46 | 0.3 | 7 | 23.3 | II-1 | 3 | 1 | 0.12 | 0.18 | 1.5 | 11.5 | 90.5% |
| Embodiment 47 | 0.3 | 7 | 23.3 | II-1 | 3 | 1 | 0.5 | 0.75 | 1.5 | 11 | 90.9% |
| Embodiment 48 | 0.3 | 7 | 23.3 | II-1 | 3 | 1 | 0.8 | 1.2 | 1.5 | 10.5 | 91.5% |
| Embodiment 49 | 0.3 | 7 | 23.3 | II-5 + II-18 | 3 | 1 | 1 | 1.5 | 1.5 | 9.8 | 92.0% |
| Embodiment 50 | 0.3 | 7 | 23.3 | II-1 | 3 | 1 | 1.14 | 1.71 | 1.5 | 9.5 | 91.3% |

TABLE 4-continued

Effect of the content of the compound of Formula I on a high-temperature storage volume expansion rate and a capacity retention rate of the lithium ion battery

| Embodiment | Electrolyte system: I-10 (content of a) % | FEC (content of b) | a/b | II-1 Composition | II-1 Content (%) | III-1 | W:K | W | K | 85° C.-24 h Thickness swelling rate (%) | capacity retention rate |
|---|---|---|---|---|---|---|---|---|---|---|---|
| Embodiment 51 | 0.3 | 7 | 23.3 | II-1 | 3 | 1 | 1.16 | 1.74 | 1.5 | 9 | 89.3% |
| Embodiment 52 | 0.3 | 7 | 23.3 | II-1 | 3 | 1 | 0.1 | 0.15 | 1.5 | 12.4 | 90.2% |

By comparing the test results of Embodiment 4 and Embodiments 42-45, it can be seen that when W/K is certain, the synergy of Formula I, Formula II and Formula III can make the lithium ion battery have the higher high-temperature cycle capacity retention rate and the lower high-temperature storage volume expansion rate at the same time, and the lithium ion battery also has the lower room-temperature direct current impedance.

As shown in Embodiment 51, when W:K is greater than 1.15, the lithium ion battery has a low capacity retention rate. As shown in Embodiment 52, when W:K is lower than 0.12, the lithium ion battery has a higher high-temperature storage volume expansion rate.

As shown in Embodiments 46-50, as W:K gradually increases in the range of 0.12-1.14, the high-temperature storage volume expansion rate of the lithium ion battery gradually decreases, but the capacity retention rate firstly increases and then decreases. This is because as the content of the compound of Formula I increases, the cathode interface is improved, so that the stability of the electrolyte is improved, and a P—N bond of the compound of Formula I can complex with the lithium salt to stabilize the lithium salt and improve the decomposition reaction of the lithium salt under high temperature, so as to reduce the volume expansion rate under high-temperature storage. However, the cathode film-forming potential of the compound of Formula I is low, the film is easily formed on the cathode surface, but with the increase of the content, the film-forming impedance is large, which makes the capacity retention rate decrease.

The above is only a few embodiments of this application, not any form of limitation of this application. Although this application is disclosed above with the preferred embodiments, which are not intended to limit this application, and some changes or modifications made by those skilled in the art using the above revealed technical content without departing from the scope of the technical solution of this application are equivalent to the equivalent implementation examples, belonging to the scope of the technical solution.

What is claimed is:

1. An electrochemical device comprising:

a cathode;

an anode comprising an anode active substance;

an isolation film disposed between the cathode and the anode; and an electrolyte, wherein the electrolyte comprises a fluoroethylene carbonate and a P—N bond-containing compound; and the P—N bond-containing compound comprises a compound having a structure shown in Formula I:

Formula I

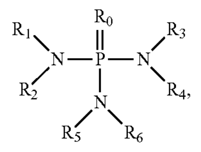

wherein $R_0$ represents $O_n$, wherein n is 0 or 1;

$R_1$, $R_2$, $R_3$, $R_4$, $R_5$, and $R_6$ are each independently selected from $C_1$-$C_6$ alkyl, $C_2$-$C_6$ alkenyl, $C_2$-$C_6$ alkynyl, or $C_1$-$C_6$ alkoxy;

or $R_1$ and $R_2$, $R_3$ and $R_4$, or $R_5$ and $R_6$ are interconnected to form, together with an N atom, a cyclic group with 2-5 carbon atoms; and based on a mass of the electrolyte, a mass percentage of the fluoroethylene carbonate in the electrolyte is a %, a mass percentage of the P—N bond-containing compound in the electrolyte is b %, and $0.1 \leq a/b \leq 200$;

wherein a ratio W:K is in a range of 0.12 to 1.15, W represents a content value of the compound of Formula I required per unit capacity in units of g/Ah, K represents a value of a specific surface area per unit mass of the anode active substance in units of $m^2/g$, and $1.0 \leq K \leq 2.0$.

2. The electrochemical device according to claim 1, wherein the compound having the structure shown in Formula I comprises at least one of a compound shown in Formula I-A or a compound shown in Formula I-B:

Formula I-A

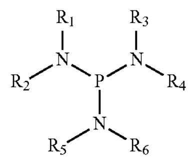

Formula I-B

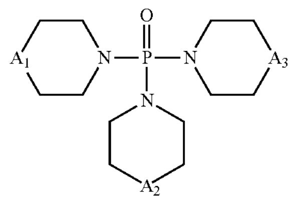

wherein $A_1$, $A_2$, and $A_3$ are each independently selected from a carbon atom, an oxygen atom, or a single bond.
3. The electrochemical device according to claim 1, wherein the P—N bond-containing compound comprises at least one of compounds shown below:
Formula 1-1
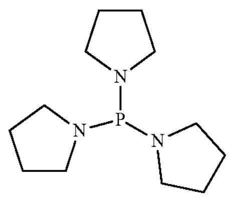
Formula 1-2
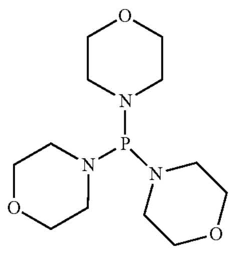
Formula 1-3
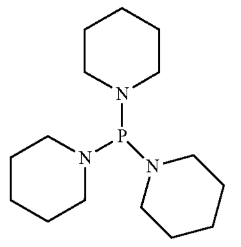
Formula 1-4
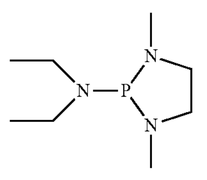
Formula 1-5
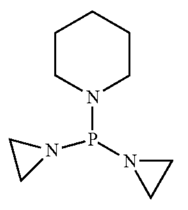
Formula 1-6
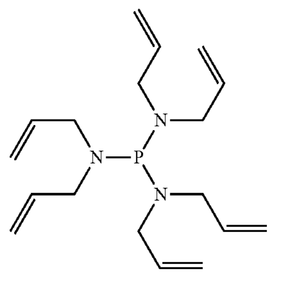
-continued
Formula 1-7
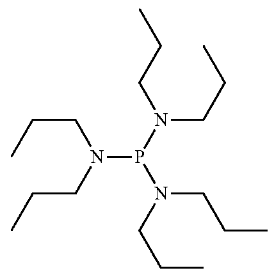
Formula 1-8
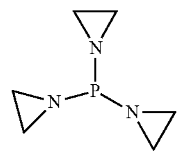
Formula 1-9
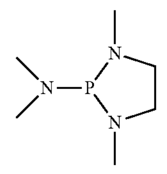
Formula 1-10
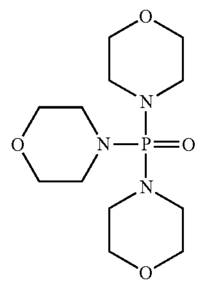
Formula 1-11
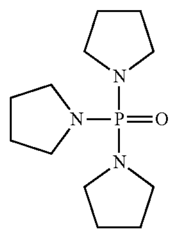
Formula 1-12
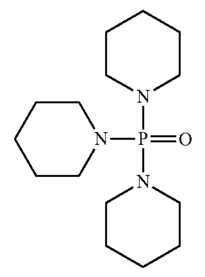

-continued

Formula 1-13

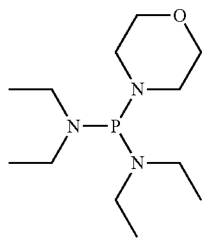

Formula 1-14

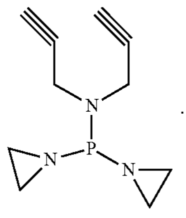

4. The electrochemical device according to claim 1, wherein based on the mass of the electrolyte, the mass percentage of the P—N bond-containing compound in the electrolyte is 0.1%-5%, and the mass percentage of the fluoroethylene carbonate in the electrolyte is 0.5%-15%.

5. The electrochemical device according to claim 1, wherein the electrolyte further comprises a sulfur-containing compound shown in Formula II:

Formula II

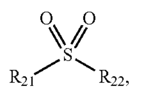

wherein $R_{21}$ and $R_{22}$ are each independently selected from straight-chain or branched-chain substituted or unsubstituted $C_1$-$C_6$ alkyl, substituted or unsubstituted $C_3$-$C_6$ cycloalkyl, substituted or unsubstituted $C_1$-$C_6$ alkoxy, substituted or unsubstituted $C_2$-$C_6$ alkenyl, substituted or unsubstituted $C_2$-$C_6$ alkynyl, sulfuryl, silyl, a cyano group, or $R_{23}O$—; a substituent group is a halogen atom; and $R_{23}$ is $C_1$-$C_6$ alkyl, substituted or unsubstituted $C_3$-$C_6$ cycloalkyl, or substituted or unsubstituted $C_3$-$C_6$ heterocyclyl;

or $R_{21}$ and $R_{22}$ are interconnected to form, together with the sulfuryl, a substituted or unsubstituted cyclic group with 3-4 carbon atoms, wherein based on the mass of the electrolyte, a mass percentage of the sulfur-containing compound in the electrolyte is 1%-6%.

6. The electrochemical device according to claim 5, wherein the sulfur-containing compound comprises one or more of the following compounds:

Formula II-1

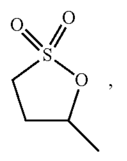

-continued

Formula II-2

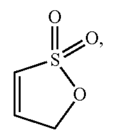

Formula II-3

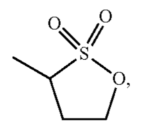

Formula II-4

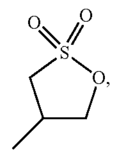

Formula II-5

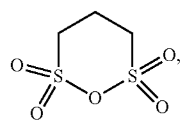

Formula II-6

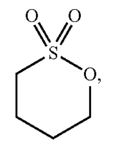

Formula II-7

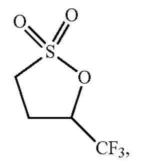

Formula II-8

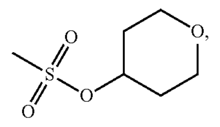

Formula II-9

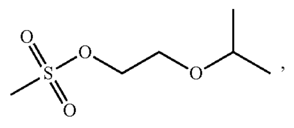

Formula II-10

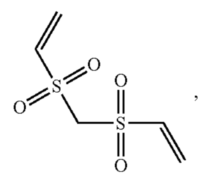

Formula II-11

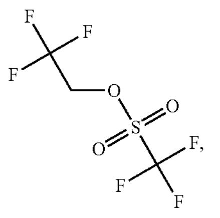

-continued

Formula II-12

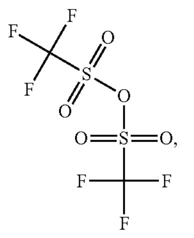

Formula II-13

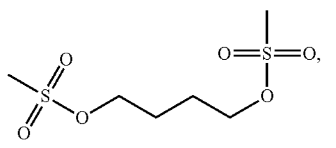

Formula II-14

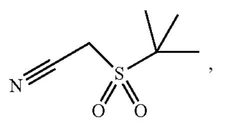

Formula II-15

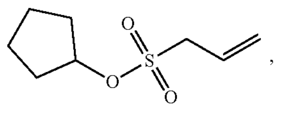

Formula II-16

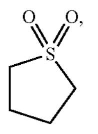

Formula II-17

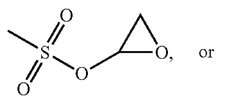

or

Formula II-18

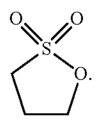

7. The electrochemical device according to claim 1, wherein the electrolyte further comprises a phosphoric acid cyclic anhydride compound, and the phosphoric acid cyclic anhydride compound comprises a compound shown in Formula III:

Formula III

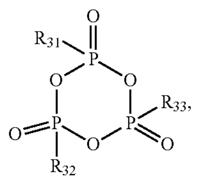

wherein $R_{31}$, $R_{32}$, and $R_{33}$ are each independently selected from H, substituted or unsubstituted $C_1$-$C_5$ saturated alkyl, substituted or unsubstituted $C_2$-$C_{10}$ unsaturated alkyl, or a $C_6$-$C_{18}$ aromatic ring.

8. The electrochemical device according to claim 7, wherein the phosphoric acid cyclic anhydride compound comprises one or more of the following compounds:

Formula III-1

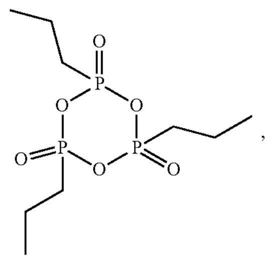

Formula III-2

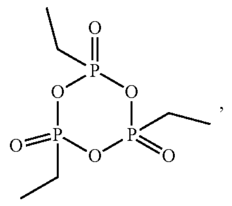

Formula III-3

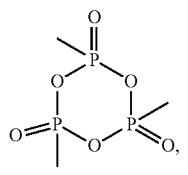

Formula III-4

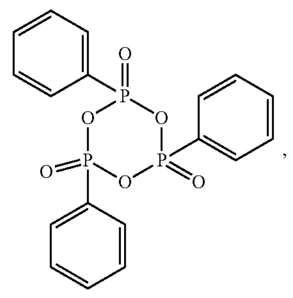

Formula III-5

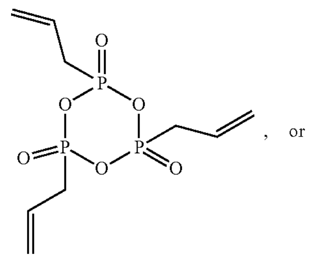

or

Formula III-6

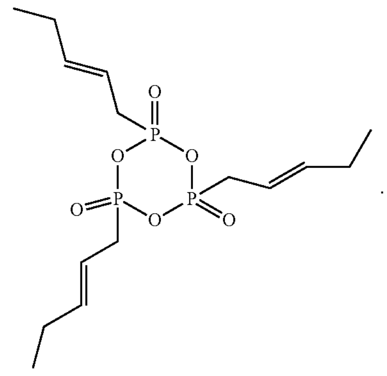

9. The electrochemical device according to claim 7, wherein based on the mass of the electrolyte, a mass percentage of the phosphoric acid cyclic anhydride compound in the electrolyte is 0.1%-3%.

10. The electrochemical device according to claim 1, wherein the electrolyte further comprises a tricarbonitrile compound, the tricarbonitrile compound comprises at least one of 1,3,5-pentanetricarbonitrile, 1,3,6-hexanetricarbonitrile, 1,2,6-hexanetricarbonitrile or 1,2,3-tris(2-cyanoethoxy)propane; and based on the mass of the electrolyte, a mass percentage of the tricarbonitrile compound in the electrolyte is 0.1%-6%.

11. The electrochemical device according to claim 1, wherein the ratio W:K is in a range of 0.5 to 1.15.

12. The electrochemical device according to claim 1, wherein the ratio W:K is in a range of 0.12 to 0.8.

13. An electronic device, comprising the electrochemical device according to claim 1.

* * * * *